C. H. STOCKBRIDGE.

Bit-Brace.

No. 6,350. Reissued March 23, 1875.

Witnesses.
Henry A Mitchell
Geo. A. Goody

Inventor
Charles H Stockbridge
By James Shepard Atty.

THE GRAPHIC CO. PHOTO-LITH. 39 & 41 PARK PLACE, N.Y.

UNITED STATES PATENT OFFICE.

CHARLES H. STOCKBRIDGE, OF WHATELEY, MASSACHUSETTS, ASSIGNOR, BY MESNE ASSIGNMENTS, TO THE MILLER'S FALLS COMPANY.

IMPROVEMENT IN BIT-BRACES.

Specification forming part of Letters Patent No. 62,232, dated February 19, 1867; reissue No. 6,350, dated March 23, 1875; application filed March 5, 1875.

*To all whom it may concern:*

Be it known that CHARLES H. STOCKBRIDGE, of Whateley, in the county of Franklin and State of Massachusetts, has invented a new and useful Improvement in Bit-Braces, of which the following is a full and exact description, which will enable others skilled in the art to make and use the same, reference being had to the accompanying drawings, forming part of this specification, in which—

Figure 1:
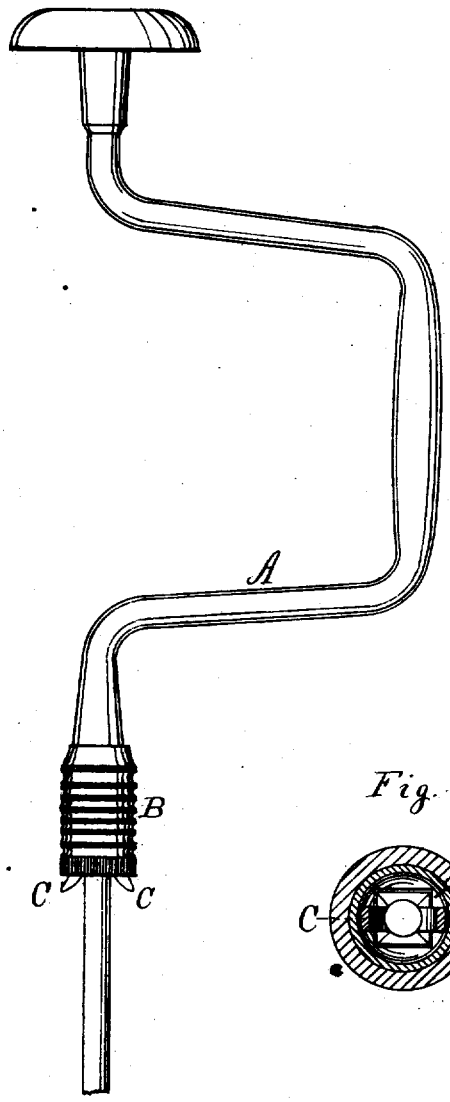
Figure 2:
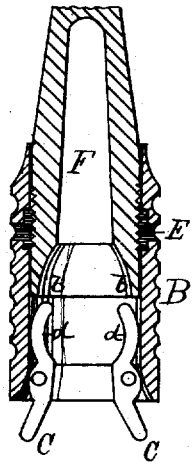
Figure 3:
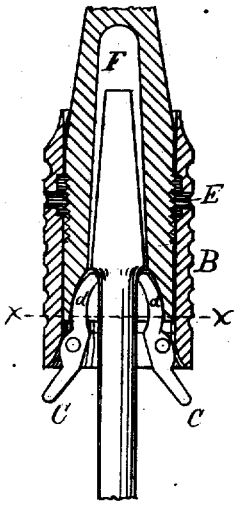
Figure 4:
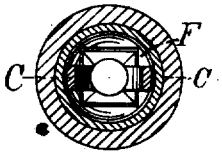

Figure 1 is an elevation of my improved brace or bit-stock with a bit placed therein ready for use. Fig. 2 is an axial section of the socket part of the brace and of the nut which surrounds it. Fig. 3 is a like axial section, showing the shank of the bit in the socket of the brace. Fig. 4 is a cross-section on the line *x x*, Fig. 3, looking upward into the socket.

This invention relates to means for fastening bits or other tools in the sockets of braces or bit-stocks; and it consists in a novel mode of securing the bit or other tool therein, involving a peculiar and novel construction of the lower part of the brace or stock.

The letter A designates a brace or bit-stock, the lower end of which is formed with a socket, F, to receive the shank of a bit or other tool. The letter B designates a nut, which is placed upon the socket of the brace, working on a screw-thread which is cut around or upon the exterior of said socket. The base of the nut B extends below the base of the socket, and carries two dogs, C C, which are pivoted within said nut, near its base, on opposite sides, where suitable recesses are made to receive them. The ends of said dogs extend below the said nut, their grasping-ends being curved or bent inward toward each other, so that they may come against the body of the bit when its shank has been inserted in the socket of the brace.

When the nut B is moved upward the curved edges *b b* at the lower end of the socket F serve the purpose of a cam in forcing the jaws *d d* of the dogs inward against the body of the bit, which is then locked and fastened in the socket of the brace, because the ends of the jaws come under the shoulders of the shank of the bit, and prevents its withdrawal.

When it is desired to release the bit the nut is moved downward, so as to remove the jaws *d d* of the dogs out of contact with the inclined surfaces *b b*, when they are free to be moved away from each other, and to let the shank of the bit or other tool pass out between them.

The direction of the screw-thread on the ring E of the nut is contrary to the direction in which the bit or other tool is to be turned in working with it, in order that the nut shall be kept up on the socket while one is operating the brace.

The invention being thus described, what is claimed as the invention of the above said CHARLES H. STOCKBRIDGE, and desired to be secured by Letters Patent, is—

The combination of the socket F, having cams *b b*, and a nut, B, provided with dogs C C, substantially as and for the purposes herein set forth.

CHARLES H. STOCKBRIDGE.

Witnesses:
L. G. WAIT,
E. T. S. HEALEY.